Feb. 26, 1935.　　　M. J. DE MASK　　　1,992,816
MULTIPLE ELECTRIC INSTALLATION
Filed July 9, 1930　　　2 Sheets-Sheet 1
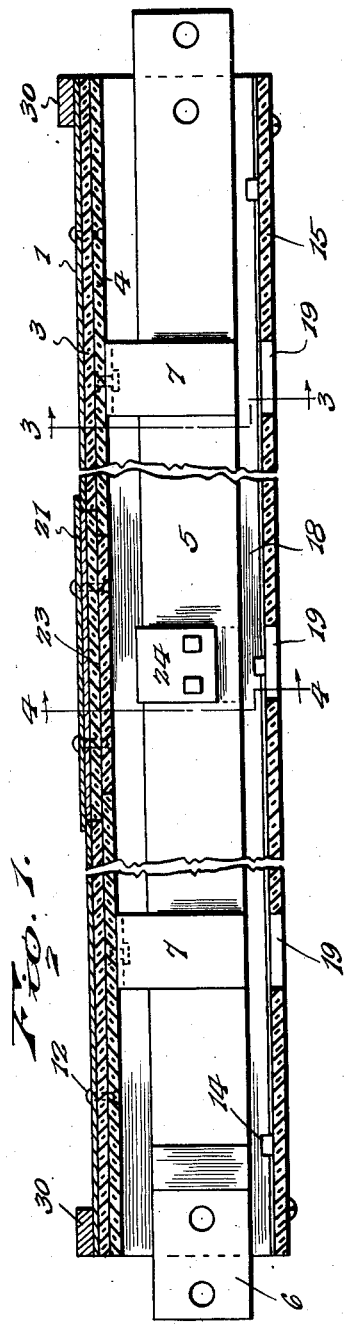
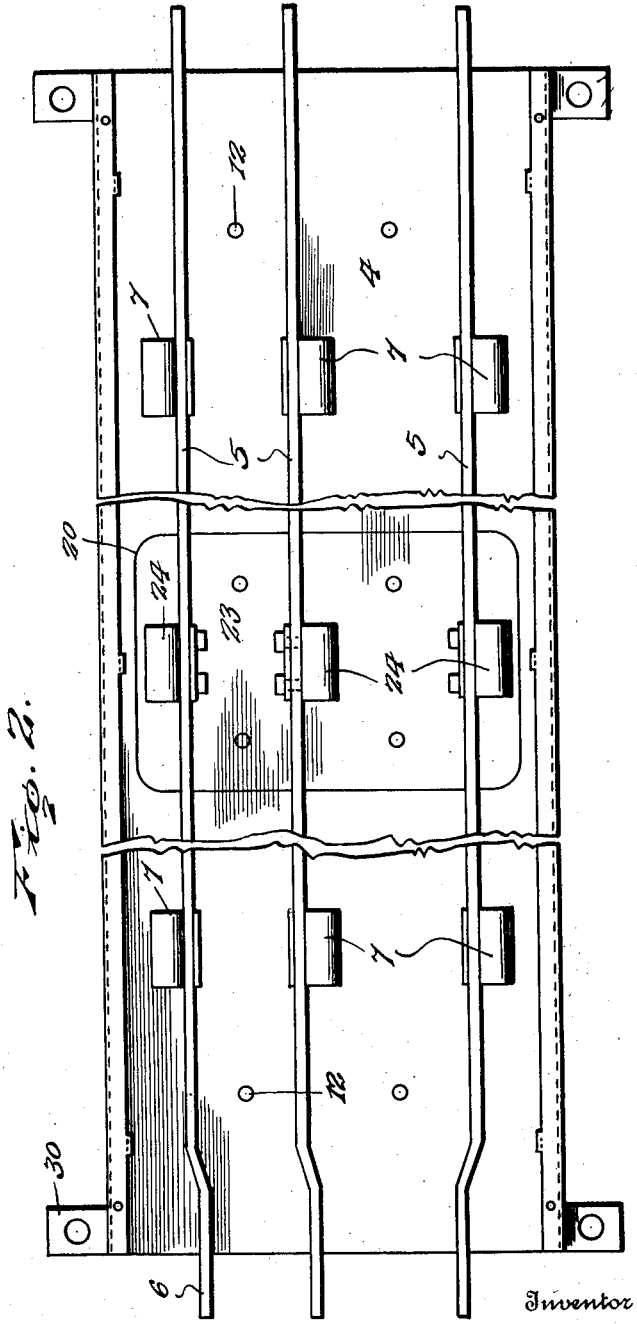
Inventor
M. J. DeMask.
By Lacey & Lacey, Attorneys

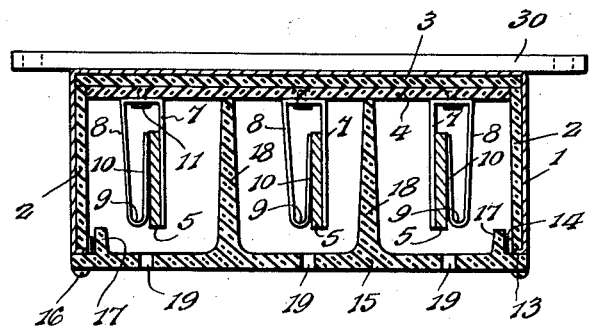
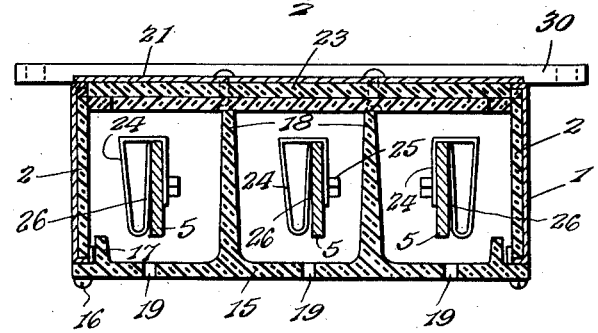
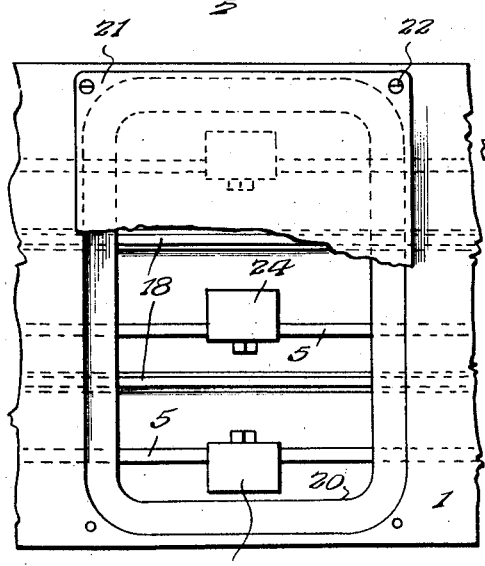
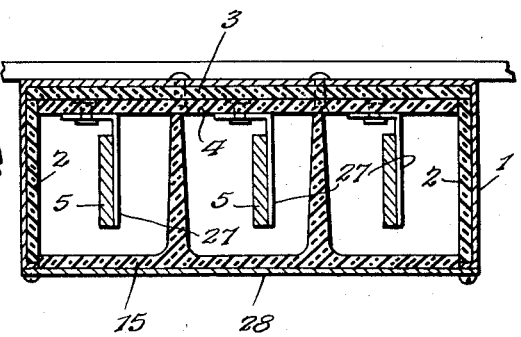

Patented Feb. 26, 1935

1,992,816

UNITED STATES PATENT OFFICE 1,992,816

MULTIPLE ELECTRIC INSTALLATION

Martin J. De Mask, Pittsfield, Mass.

Application July 9, 1930, Serial No. 466,803

15 Claims. (Cl. 247—3)

The present invention relates to electrical installations of that type in which a conduit is mounted upon some fixed part of a room or building and provided at intervals with means whereby branch conductors may be fitted thereto for conveying current to any desired point of use. The present invention has particular reference to the means for mounting the conductor or bus bars, and its object is to provide a very simple and convenient construction whereby the sections of the bus bars may be coupled together to produce conductors of any desired length and may be thoroughly housed and protected against accidental contact so that injury to by-standers or operators will be avoided. Another object of the invention is to provide a very convenient and efficient means for making electrical contact with the terminals of conductor plugs, and the invention also has for its object the provision of a simple and convenient construction whereby thorough insulation will be provided and contacts may be made at points in the length of the bus bars wherever desired. The invention is illustrated in the accompanying drawings and will be hereinafter fully described, the novel features being particularly defined in the appended claims.

In the accompanying drawings:

Figure 1 is a view, partly in longitudinal section and partly in plan, of a portion of a conduit embodying the present invention, Fig. 2 is a side view of the same with the cover removed, Fig. 3 is a section on the line 3—3 of Fig. 1, Fig. 4 is a section on the line 4—4 of Fig. 1, Fig. 5 is a detail rear elevation showing a handhole and a portion of the cover therefor, and Fig. 6 is a detail showing a slightly different form of support for the bus bars.

In carrying out the present invention, there is provided a casing 1 which is preferably of metal in order to possess the desired durability and strength and is preferably sheet metal whereby it may be readily bent into the desired shape and will be free of excessive weight. This casing 1 is lined with insulation, as shown at 2, and in the back or top of the casing the insulation is arranged in two plies or layers, as shown at 3 and 4. The bus bars or conductors 5 are of metal, and in the present illustration, three bars are provided within each casing, the bars being constructed in sections so that they may be extended to any desired length and being each straight at one end and offset at the opposite end, as shown at 6, whereby the ends of meeting sections may be overlapped and riveted or otherwise firmly secured together so as to be efficiently united both electrically and mechanically. The bus bars are supported within the casing by hanger clips 7 each of which has one depending arm secured by welding or riveting or otherwise to one side of the respective bus bar and has at its opposite side a depending resilient arm 8 which is doubled upon itself, as shown at 9, so that its terminal 10 will project upwardly between the two sides of the hanger or bracket and be yieldably held by its own resiliency against the adjacent side of the adjacent bus bar. The shoulder or upper end of the hanger or bracket is secured firmly in place by a rivet or similar device 11 inserted through said upper end of the bracket and through the inner ply 4 of the top insulation, the outer ply 3 of said insulation serving to insulate the rivets from the back or top of the casing while other rivets or fastening devices, indicated at 12, are fitted through the top or back and through both layers or plies of the insulation to secure the latter in place. It will be noted that the side sheets of insulation 2 have their upper edges disposed between the side edges of the lower ply 4 and the sides of the casing while the free edges of the casing are turned inwardly to project under the insulating sheets 2, as shown at 13, and at intervals have teeth or lugs 14 struck up therefrom to engage against the inner face of the respective sheets 2, as shown clearly in Figs. 3 and 4, whereby said sheets 2 will be firmly supported within the casing.

A cover 15 preferably of insulating material is provided and this cover is coterminous with the casing. The cover is fitted against the flanges 13 of the casing and is secured in place by screws 16 or the like inserted through the edge portion of the cover and the edges of the insulation 2, as will be understood. The cover is provided adjacent its edges with ribs 17 which are disposed close against the side insulation 2 and thereby serve to guide the cover when it is being fitted in place and also prevent accidental contact between the terminals of an inserted plug and the lugs or teeth 14 so that possible short circuits through such contact cannot occur. The cover is also provided on its inner side with partitions or barriers 18 extending longitudinally of the cover and of such height that their free edges will engage the inner insulation 4, as shown clearly in Fig. 3, these partitions or barriers being preferably formed integral with the cover and being, preferably, of insulation so that the several bus bars 5 and the cleats or hangers connected therewith will be separated from each other electrically and, consequently, there will be no liability of short circuits or interference between current flowing along the separate bus bars. The cover is provided with slots or openings 19 at proper points in its length and so located that terminals of a plug inserted therethrough will be engaged between the resilient end 10 of a hanger and the adjacent bus bar 5 and, consequently, will receive current therefrom to be carried out to the point of use. Upon referring to Figs. 3 and 4, it will be noted that the openings 19 are respectively located off center with respect to the several bus bars but under the bus bars so that a plug terminal inserted through any opening will be guided into engagement with a bus bar and a cleat or hanger bearing against the side of the same. The hangers or brackets 7 obviously serve as supports for the bus bars as well as contacts to permit current to be transferred through a branch conductor. They are provided adjacent the ends of each section of the conduit and at such intermediate points as may be desired. The back or top of the casing is provided at intervals with hand-holes 20 and a cover 21 is provided for each hand-hole, the cover being adapted to extend over the sides of the hand-hole at its edges, as shown in Fig. 4 and in Fig. 5, and be secured upon the cover by screws or the like 22 inserted through the corners of the cover into the casing, as will be understood. On its inner side the cover carries insulation 23 which is provided in two or more layers so that it will correspond with and fit to the plies 3 and 4, as will be understood upon reference to Figs. 1 and 4. These hand-holes 20 provide access to the several bus bars without requiring removal of the cover 15 and facilitate the application of additional clips 24 to the bus bars so as to permit accommodation of an increasing number of branch conductors as the demand for service may grow. These clips 24 are similar to the hangers or brackets 7 but do not extend to and are not secured to the cover or the top or back of the casing but are secured to one side of the respective bus bars by bolts or screws 25 and extend across the upper edges of the bus bars to have their free resilient ends doubled upon themselves and provide spring terminals 26 arranged to bear against the adjacent bus bar and make firm contact with a plug terminal when the latter is inserted.

In Fig. 6, I have shown brackets or hangers 27 which may be welded or otherwise intimately united to the respective feeder or bus bars and have their upper ends riveted or otherwise firmly secured to the insulation at the back or top of the conduit. These hangers 27 do not have the resilient terminals which are to be engaged by plug terminals and the cover is not provided with openings alined with said hangers, this formation being intended more particularly for use with long lengths of feeder bars which carry the current to sections with which plugs may be engaged. It is also adapted to risers in tall buildings. It will be understood that contact clips will be used between or in place of the hangers 27 wherever it may be desired to draw current, and that suitable holes in the cover member will be provided in registry with the clips to permit access thereto. If desired, an outer plate 28 may be extended across the cover as a support therefor, the cover being so proportioned as to fit between the side insulation sheets 2 so that the outer cover 28 may bear against and be secured to the edges of the casing. The device is exceedingly simple and may be installed at a low cost. It provides an efficient and safe means for conducting high voltage current to various points and facilitates the mounting of lamp or tools at any point where the use of the same may be desired. To connect a tool at any point all that is needed is to insert the plug at the end of the cord into the conduit through an opening 19, and, when the use of the tool is no longer desired, merely withdrawing the plug will disconnect the same, leaving the conduit free of projecting elements which might catch in the clothing of a passer-by and might be the cause of shocks or other injuries.

The conduit is secured to a side wall or to a ceiling or other fixed support by suitable fastening devices inserted through hanger bars 30 secured across the closed side of the conduit.

Having thus described the invention, I claim:

1. Means for the purpose set forth comprising an insulated conduit, feeder bars extending longitudinally of the conduit, and hangers secured to the conduit and feeder bars for supporting the feeder bars within the conduit, said hangers forming electrical contacts for engagement by an inserted plug.

2. Means for the purpose set forth comprising an insulated conduit, a plurality of feeder bars secured longitudinally within the conduit in parallel spaced relation, a cover of insulating material secured on the conduit and provided with openings to permit the insertion of plugs to make contact with the feeder bars, and parallel spaced barriers of insulation on the inner side of said cover extending across the conduit in the spaces between the feeder bars to completely insulate said bars.

3. Means for the purpose set forth comprising a conduit of insulation, feeder bars extending longitudinally of the conduit in parallel spaced relation, hangers supporting the respective feeder bars within the conduit and having free resilient terminals bearing against the bars to be engaged by an inserted plug, and a cover of insulation extending over the open side of the conduit and having openings alined with the hangers to permit insertion of a plug and provided with barriers to extend across the conduit between adjacent feeder bars.

4. Means for the purpose set forth comprising a conduit of insulation having an open side, feeder bars extending longitudinally of the conduit, hangers supporting the feeder bars from the closed side of the conduit, clips secured upon the respective feeder bars and having resilient terminals bearing against the sides of the respective bars, and a cover of insulation extending over and secured upon the open side of the conduit and provided with openings alined with the resilient terminals of the clips and having barriers of insulation extending across the conduit between adjacent feeder bars.

5. Means for the purpose set forth comprising a conduit of insulation having an open side, hand-holes in the closed side of the conduit, covers for said hand-holes secured upon the conduit and provided with facing of insulation to fit within the hand-hole, feeder bars extending longitudinally of the conduit, clips to be secured to said feeder bars at the hand-holes, a cover secured upon the open side of the conduit and having openings therethrough alined with the clips, and barriers on the inner side of the cover extending across the conduit between adjacent feeder bars.

6. Means for the purpose set forth comprising a conduit of insulation, feeder bars mounted within the conduit and extending longitudinally thereof in parallel spaced relation, a cover of insulation having openings therethrough to permit the insertion of plug terminals to make contact with the feeder bars, and means for securing the cover across the open side of the conduit, the cover being provided on its inner side near its edges with ribs to fit within the conduit and between its edges with barriers extending across the conduit between adjacent feeder bars.

7. A receptacle for electric distribution systems comprising an elongate, metallic channel section, casing, having an open front, a plurality of laterally separated current conducting strips mounted in the casing, each strip provided with spaced contact clips, a removable dielectric cover member closing the front of the casing, integral partition means extending from the cover and between the conducting strips and forming an individual compartment for each strip, and an aperture in the cover opposite each contact clip for receiving the prong of a connector.

8. Means for the purpose set forth comprising an insulated conduit, a plurality of feeder bars extending longitudinally of the conduit, hangers secured to the conduit and feeder bars for supporting the feeder bars within the conduit, a cover of insulating material secured to the conduit, and spaced barriers of insulation on the inner side of said cover extending across the conduit in the spaces between the feeder bars to completely insulate said bars.

9. In a device for use in the distribution of electrical power from a conduit by means of a distributing connector having contact members for entering the conduit, that construction of conduit comprising an elongated substantially channel shaped member, a cover closing the open side of the channel shaped member and forming therewith a closed casing, a plurality of current carrying feeder bars within the casing, means engaging the feeder bars at intervals to support them within the casing separated and electrically insulated from the casing and from each other, with the span of the bars between said supporting means spaced out of contact with any portion of the casing and unsupported except at said intervals, the cover having openings along its length intermediate said supporting means for receiving the contact members of the distributing connector whereby the said contact members may make electrical connection with the feeder bars when the members are inserted into the casing, the feeder bars being of sufficient rigidity to resist the contact making thrust of the contact members of the distributing connector without direct support from the casing at the point of coupling.

10. In a device for use in the distribution of electrical power from a conduit by means of a distributing connector having contact members for entering the conduit, that construction of conduit comprising an elongated substantially channel shaped member, a cover closing the open side of the channel shaped member and forming therewith a closed casing, a plurality of current carrying feeder bars within the casing, means for supporting the feeder bars spaced from the walls of the casing, from the cover, and from each other, and electrically insulated from the walls of the casing, the cover having openings along its length intermediate said supporting means for receiving the contact members of the distributing connector whereby the said contact members may make electrical connection with the feeder bars when the members are inserted into the casing, the feeder bars being of sufficient rigidity to resist the contact making thrust of the contact members of the distributing connector without direct support from the casing at the point of coupling, said cover having spaced parallel barriers of insulation extending between but out of contact with the feeder bars.

11. In a device for use in the distribution of electrical power from a conduit by means of a distributing connector having contact members for entering the conduit, that construction of conduit comprising an elongated casing, a plurality of narrow, flat, current carrying feeder bars within the casing, means engaging the feeder bars at intervals to support them within the casing separated and electrically insulated from the casing and from each other, with the span of the bars between said supporting means spaced out of contact with any portion of the casing and unsupported except at said intervals, the casing having openings along its length intermediate said supporting means for receiving the contact members of the distributing connector whereby the said contact members may make electrical connection with the feeder bars when the members are inserted into the casing, the feeder bars having their greatest cross-sectional dimension at right angles to that side of the conduit having openings and being of sufficient rigidity to resist the contact making thrust of the contact members of the distributing connector without direct support from the casing at the point of coupling.

12. In a device for use in the distribution of electrical power from a conduit by means of a distributing connector having contact members for entering the conduit, that construction of conduit comprising an elongated substantially channel shaped member, a cover closing the open side of the channel shaped member and forming therewith a closed casing, a plurality of current carrying feeder bars within the casing, means for supporting the feeder bars out of contact with the walls of the casing and out of contact with each other, and electrically insulated from the walls of the casing, insulating barriers on the cover extending between the feeder bars but out of contact with them, the cover having openings at points spaced along its length to permit insertion of the contact members of the distributing connector whereby said members may make electrical contact with the feeder bars.

13. In a device for use in the distribution of electrical power from a conduit by means of a distributing connector having contact members for entering the conduit, that construction of conduit comprising an elongated substantially channel shaped member, a cover closing the open side of the channel shaped member and forming therewith a closed casing, a plurality of current carrying feeder bars within the casing, means engaging the feeder bars at intervals to support them within the casing separated and electrically insulated from the casing and from each other, with the span of the bars between said supporting means spaced out of contact with any portion of the casing and unsupported except at said intervals, the cover having openings at points spaced along its length to permit insertion of the contact members of the distributing connector whereby said members may make electrical contact with the feeder bars.

14. In a device for use in the distribution of electrical power from a conduit by means of a distributing connector having contact members for entering the conduit, that construction of conduit comprising an elongated casing, a plurality of current carrying feeder bars within the casing, means engaging the feeder bars at intervals to support them within the casing separated and electrically insulated from the casing and from each other, with the span of the bars between said supporting means spaced out of contact with any portion of the casing and unsupported except at said intervals, the casing having openings along its length intermediate said supporting means for receiving along the conduit the contact members of the distributing connector, and contact making spring clips electrically connected to the feeder bars and supported by the feeder bars in substantial alignment with the openings.

15. Means for the purpose set forth comprising a metallic casing, feeder bars extending longitudinally of the conduit, hangers secured within the casing and secured to the feeder bars for supporting the feeder bars within the casing, said hangers forming electrical contacts for engagement by an inserted plug, and means for insulating the hangers from the metallic casing.

MARTIN J. DE MASK. [L. S.]